United States Patent [19]
Miller

[11] 3,793,620
[45] Feb. 19, 1974

[54] METHOD FOR GEOPHYSICAL PROSPECTING

[76] Inventor: Dale E. Miller, 108 Virginia, Ponca City, Okla. 74601

[22] Filed: July 3, 1972

[21] Appl. No.: 268,395

[52] U.S. Cl................ 340/15.5 MC, 340/15.5 CP, 340/15.5 DP
[51] Int. Cl......... G01v 1/22, G01v 1/28, G01v 1/13
[58] Field of Search... 340/15.5 MC, 15.5 CP, 1 DP

[56] References Cited
UNITED STATES PATENTS

| | | | |
|---|---|---|---|
| 3,746,122 | 7/1973 | Davis | 340/15.5 MC |
| 3,529,282 | 9/1970 | Brown et al. | 340/15.5 MC |
| 3,409,870 | 11/1968 | Mounce et al. | 340/15.5 CP |
| 3,327,287 | 6/1967 | Ball et al. | 340/15.5 MC |

OTHER PUBLICATIONS

Durkin et al., "Isochrans for a 3-D Seismic System," 12/71, pp. 1,099–1,118, Geophysics, Vol. 36, No. 6.
Berryman et al., "Reflections From Multiple Transition Layers," 4/58, pp. 223–243, Geophysics, Vol. 23, No. 2.

*Primary Examiner*—Maynard R. Wilbur
*Assistant Examiner*—N. Moskowitz
*Attorney, Agent, or Firm*—William J. Miller

[57] ABSTRACT

A method for deriving sub-surface seismic information from over a relatively large expanse of land to determine with increased accuracy the strike, dip, velocity and related information for selected strata. The method consists of utilizing one or more cross pattern source-receiver arrays wherein each cross leg is comprised of alternating source and receiver units or groups such that each cross pattern enables derivation of strike, dip, velocity (SDV) quadrant patterns as well as related in-line common depth point data, all data types and patterns then being considered in interrelation. Use of the method in survey allows that spaced cross pattern arrays be utilized to obtain related data for each of the individual cross pattern arrays, both quadrant pattern and common depth point data, with further derivation of offset data, both quadrant pattern and common depth point data, as enabled by that energy proceeding from one cross pattern to another in accordance with predetermined source-receiver relationships.

20 Claims, 5 Drawing Figures

METHOD FOR GEOPHYSICAL PROSPECTING

CROSS-REFERENCE TO RELATED APPLICATION

The present invention is related to subject matter of U.S. Pat. application Ser. No. 174,744 filed on Aug. 25, 1971 in the name of Waters et al. and entitled "Method for Reconnaissance Geophysical Prospecting".

BACKGROUND OF THE INVENTION

1. Field of the Invention

The invention relates generally to geophysical prospecting systems and, more particularly, but not by way of limitation, it relates to improvements in seismic prospecting methods wherein more determinative data can be derived for seismic source-receiver cross pattern quadrant patterns, both local and offset.

2. Description of the Prior Art

The prior art relative to strike, dip, velocity (SDV) geophysical sounding techniques is essentially non-existent with respect to generally available published works, and the most pertinent prior teachings are probably those contained in the above-cited related application Ser. No. 174,744 as well as U.S. Pat. application Ser. No. 228,864 filed on Feb. 24, 1972 in the name of Waters et al. and entitled "Improvements in Geophysical Prospecting Methods". The only prior teachings of even general application relative to the present invention are U.S. Pat. Nos. 3,529,282 and 2,597,727; these teachings being directed to analog compilation of signal return derived through successive and continuous cross or oblique patterned, beam steered signal compilation, stacking and general reduction of signal-to-noise ratio. Such prior methods are necessarily time consuming and best applied only for detailing of a given subsurface area rather than for any form of rapid survey or reconnaissance scanning to derive high content initial information.

SUMMARY OF THE INVENTION

The present invention contemplates a seismic energy prospecting method wherein one or more geophone cross patterns of alternate source and receiver configuration may be utilized to obtain both local and interrelated offset information utilizing both quadrature arrayed seismic return and linear common depth point information as derived along the cross lines. In a more limited aspect, the invention consists of using a seismic sounding cross pattern wherein alternately disposed sources and receivers make up each cross line of the individual cross pattern, such cross lines, being at essentially right angles one to the other. Repeated shot or vibrational impulse data may be processed across diagonal reaches of the individual cross patterns to record data for selected substratum within the respective quadrants of the cross pattern. In effect, two partially superimposed quadrant data patterns are obtained for each quadrant, and data derived for sources and receivers in each cross line further provide common depth point data with desired redundancy along the extent thereof. Consideration and evaluation of data from all quadrant data patterns relative to the inline derived CDP information enables the establishment of more complete data indication relative to the selected stratum.

Therefore, it is an object of the present invention to provide a geophysical prospecting method for more rapidly deriving more meaningful data over a large area.

It is also an object of the invention to provide an accurate method of geophysical reconnaissance which provides more complete data as to strike, dip and velocity parameters over a large land area.

It is yet another object of the invention to provide a seismic sounding method which enables the obtaining of more specific data relative to selected strata within the earth.

It is still another object of the present invention to provide a method for obtaining desired data of relatively concentrated nature for a large land area while maintaining time and crew expense at a minimum.

Finally, it is an object of the present invention to provide a geophysical prospecting method which enables establishment of continuous data relative to a subsurface stratum without requiring continuous repositioning of surface source-receiver arrays.

Other objects and advantages of the present invention will be evident from the following detailed description when read in conjunction with the accompanying drawings which illustrate the invention.

DETAILED DESCRIPTION OF THE INVENTION

Figure 1:
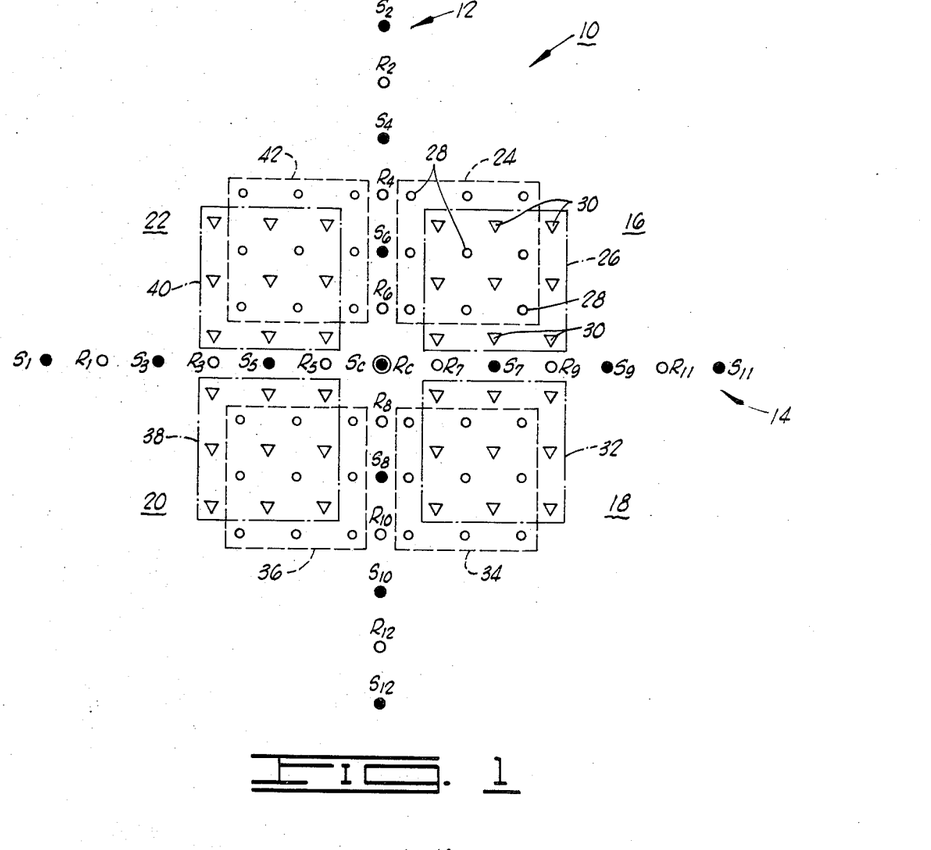
FIG. 1 is a plan diagram of a source-receiver arrangement as applied in accordance with the modified SDV reconnaissance procedure effected in accordance with the present invention.

Referring to FIG. 1, an SDV-modified cross pattern 10 consists of surface-disposed sources and receivers as arrayed in a cross pattern. Thus, SDV-modified cross pattern 10 consists of a cross line 12 disposed at essentially right angles to a cross line 14, each of which cross lines consists of seismic energy sources and receivers arrayed in linear, equi-spaced and alternating disposition. The cross line 12 is comprised of sources S2, S4, S6, SC, S8, S10 and S12 as aligned the alternately placed receivers R2, R4, R6, R8, R10 and R12. Cross line 14 is similarly constructed of seismic energy sources S1, S3, S5, SC, S7, S9 and S11 in linear array with alternating seismic receivers R1, R3, R5, RC R7, R9 and R11.

The central position may be covered by both the source SC and receiver RC, this serving to yield still another parameter for analysis in the final data derivations; or, the cross lines 12 and 14 may be completely uniform and containing only source SC at the center point. While the sources employed in carrying out the invention may be any of the well-known forms of shot sources, explosive impulse sources, vibrational sources or the like, the method under present planning and operation is carried out with the use of vibrational sources to impart a controlled frequency seismic energy signal into the earth for a predetermined duration.

The SDV-modified cross pattern 10 delineates reflection point data for distinct data quadrants 16, 18, 20 and 22 as disposed between respective diagonal reaches of cross lines 12 and 14.

With respect to a select subsurface stratum, or predefined depth of reflected energy return, data is derived for data quadrant 16 in each of two distinct data quadrant patterns 24 and 26. Data quadrant pattern 24 reflecting seismic energy successively emanating from each of sources S2, S4 and S6 as received at each of the detectors or seismic energy receivers R7, R9 and R11. In like manner, successive energization of seismic energy sources S7, S9 and S11 with detection of reflected energy at diagonally opposite receivers R2, R4 and R6 will enable a reflection point data quadrant pattern 26 as comprised of the plurality of reflection points 30. Similar partially overlayed data quadrant patterns are obtained in each of the remaining quadrants 18, 20 and 22 in like manner. Thus, data quadrant 18 will include establishment of data quadrant patterns 32 and 34, data quadrant 20 will include data quadrant patterns 36 and 38, and data quadrant 22 will include data quadrant patterns 40 and 42.

Figure 2:
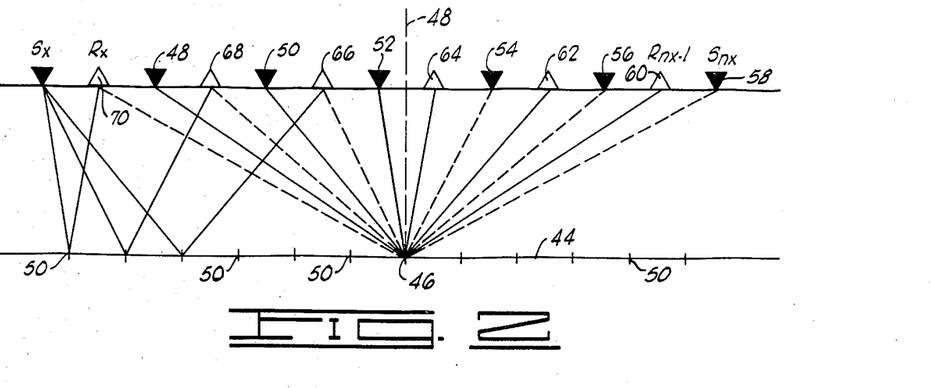
FIG. 2 is a schematic illustration of method of operation in deriving common depth point data along a survey line.

In addition to the data reflection points established for each of the related data quadrant patterns 24/26, 32/34, 36/38 and 40/42 common depth point information may be derived along the extent of each of cross lines 12 and 14. Thus, as shown in FIG. 2, successive energization of a preset plurality of the seismic sources SX through $S_nX$ enable compilation of CDP data for a selected stratum or common depth point, indicated generally by a line 44. Such common depth point or CDP data can be established with high redundancy, depending upon the number of individual energy reflections utilized in compiling the data per depth point. Thus, as shown in FIG. 2, data relating to a common depth point 46 may be established with as much as sixfold redundancy as energy from each of seismic sources 48, 50, 52, 54, 56 and 58 is reflected to respective seismic energy receivers 60, 62, 64, 66, 68, and 70. Such redundancy can be still further increased by extending the line and number of sources and receivers utilized, it being understood that redundancy will be increased through the center of the source-receiver line as opposed to the decreasing redundant depth point data indications at the ends thereof. CDP point 46 is established utilizing the offset distance from line 48 to each of the respective source-receiver combinations yielding data. In like manner, CDP data may be established for each and every one of the common depth points 50 along the pattern line.

Thus, data derived from each of the plurality of data quadrant patterns 24, 26 and 32–42 (FIG. 1) are susceptible of inter-quadrant data evaluation to establish highly accurate strike, dip and velocity information relative to the terrain site, with further verification and/or correction relative to CDP data as derived along each of cross lines 12 and 14. Still additional data as to direct depth reflection times can be derived from the center point or source SC-receiver RC energy return, such data being further evaluated relative to previously derived quadrant and CDP data. Such data as derived from a single cross pattern would provide only local indication for that situs over which the SDV-modified cross pattern 10 was located; usage of one or more additional SDV-modified cross patterns disposed at selected distances removed from SDV-modified cross pattern 10 will enable derivation of a second group of local data plus a group of offset data intermediately disposed between the selected local data patterns. Such usage of plural SDV-modified cross patterns will be described in greater detail below.

Data processing for derivation of meaningful output indications relative to the SDV-modified cross patterns may be carried out either by specialized analog equipment or by digital processing systems; however, the programmed digital computation system proves to be the most efficient manner of processing the data, and such a program, similar to that disclosed in U.S. application Ser. No. 174,744, is set forth below. Input measurements include travel time from source to reflecting stratum to receiver for a selected number of independent paths, preferably four or more for increased reliability of parameter estimates. The velocity estimate will not assume a flat plane with no dip as is the case with most velocity estimates, and all parameters are allowed to vary simultaneously until the best of the travel times is obtained.

The method assumes a constant velocity layer V between the reference plane or earth surface and the selected substratum or reflecting horizon. A quantity $c$ represents the perpendicular distance from a selected surface origin to the reflecting plane, while quantities L and m are representative direction cosines of the perpendicular relative to the X and Y axis respectively, X and Y being coordinate designations of the earths surface with the Z axis representing the perpendicular. Thus, if $m$ is a direction cosine relative to the Z axis, then the relation will equate as $$L^2 + m^2 + n^2 = 1 \qquad (1)$$

The equation of the plane is then $$Lx + my + nz = c \qquad (2)$$

With respect to each source and receiver on the earth's surface, its position can be designated as source position $P_j$ ($X_j$, $Y_j$, O) and receiver position $P_i$ ($X_i$, $Y_i$, O). Thus, an image point of a ray path or source $P_j$ may be projected downward to a point $I_j$ which forms a hypotenuse $P_i I_j$ of a right triangle forming a plane defined as source $P_j$, image point $I_j$, receiver $P_i$, Thus, it will then follow that $$D^2_{ij} = [x_j - x_i (1 - 2L^2) + 2Lmx_i - 2L_c]^2$$
$$+ [y_j - y_i (1 - 2m^2) + 2Lmx_i - 2mc]^2$$
$$+ [2nc - 2Lnx_i - 2nmy_i]^2 \qquad (3)$$

where D is equal to the distance from source to reflector to receiver for the particular source-receiver combination.

Letting K equal $(1/V)2$, and letting $n^2$ equal the quantity $(1-L^2-m^2)$, where V equals velocity and T is equal to energy travel time, then the relation holds as $$T^2_{ij} = K \{[x_j - x_i (1 - 2L^2) + 2Lmy_i - 2Lc]^2$$
$$+ [y_j - y_i (1 - 2m^2) + 2Lmx_i - 2mc]^2$$
$$+ 4(1 - L^2 - m^2) [c - Lx_i - my_i]^2\} \qquad (4)$$

The parameters L, V, m and c are then determined for the case where the relationship $$\sum_{ij} (t_{ij} - T_{ij})^2 \qquad (5)$$

is a minimum, and $t_{ij}$ are measured reflection travel times. The reflection travel times utilized at this point may be measured through the use of standard seismic equipment.

Since it is necessary to estimate four independent parameters, it is necessary that at least four independent paths to the plane be measured in order to obtain a solution. For added statistical error cancellation, it is recommended that several more paths, on the order of at least 10, also be measured and utilized. By knowing the source and receiver locations, and the measured travel time for all reflecting paths, L, m, n, c and V can be estimated. As these parameters vary nonlinearly, standard nonlinear estimation techniques must be utilized in formulating the estimated values. Thus, it is suggested to use techniques such as those described in "BMD, Biomedical computer programs, X-series supplement", techniques which utilize step-wise Gauss-Newton iterations, such procedures being well documented in the statistical literature since about 1960.

Utilization of this technique will require that the function (Equation 1) and the partial derivative of the function with respect to each parameter, be defined. Thus, the partial derivatives above mentioned may be defined as follows:

$$\partial T_{ij}/\partial V = (-1/V^2)\{[x_j - x_i(1-2L^2) + 2Lmy_i - 2L_c]^2 + [y_j - y_i(1-2m^2) + 2Lmx_i - 2mc]^2 + 4(1-L^2-m^2)[c-Lx_i-my_i]^2\} \qquad (6)$$

$$\partial T_{ij}/\partial L = (4/V)\{(x_j - x_i(1-2L^2) + 2Lmy_i - 2Lc)(2Lx_i + my_i - c) + mx_i(y_j - y_i(1-2m^2) + 2Lmx_i - 2mc) - 2x_i(1-L^2-m^2)(c-Lx_i-my_i - 2L(c-Lx_i - my_i)^2\} \div$$

$$\{2[(x_j - x_i(1-2L^2) + 2Lmy_i - 2Lc)^2 + (y_j - y_i(1-2m^2) + 2Lmx_i - 2mc)^2 + 4(1-L^2-m^2)(c-Lx_i-my_i)^2]\}^{-1} \qquad (7)$$

$$\partial T_{ij}/\partial m = (4/V)\{Ly_i(x_j - x_i(1-2L^2) + 2Lmy_i - 2Lc)(y_j - y_i(1-2m^2) + 2Lmx_i - 2mc)(2my_i + Lx_i - c) - 2y_i(1-L^2-m^2)(c-Lx_i-my_i) - 2m(c-Lx_i - my_i)^2\} \div$$

$$\{2[(x_j - x_i(1-2L^2) + 2Lmy_i - 2Lc)^2 + (y_j - y_i(1-2m^2) + 2Lmx_i - 2mc)^2 + 4(1-L^2-m^2)(c-Lx_i-my_i)^2]\}^{-1} \qquad (8)$$

$$\partial T_{ij}/\partial c = (-4/V)\{L(x_j - x_i(1-2L^2) + 2Lmy_i - 2Lc) + m(y_j - y_i(1-2m^2) + 2Lmx_i - 2mc) - 2(1-L^2-m^2)(c-Lx_i-my_i)\} \div$$

$$\{2[(x_j - x_i(1-2L^2) + 2Lmy_i - 2Lc)^2 + (y_j - y_i(1-2m^2) + 2Lmx_i - 2mc)^2 + 4(1-L^2-m^2)(c-Lx_i-my_i)^2]\}^{-1} \qquad (9)$$

If the reflecting horizon is significantly different from a plane, the estimates of the direction and amount of dip, as well as the average velocity, will be affected. The validity of the planar assumption can be tested by processing the data by halves, i.e., computing independent estimates for pairs of data quadrants such as $(Q_1, Q_2)$, $(Q_3, Q_4)$, $(Q_1, Q_4)$ and $(Q_2, Q_3)$, where Q is representative of the quadrant data. If these estimates are sufficiently close to the same value, planar assumption is valid.

Due to the high degree of correlation between dip parameters (L,m) and the velocity parameter for a single quadrant, it is impractical to estimate separate parameters (L, m, V) for each quadrant independently.

However, due to the physical characteristics of average velocity, it is reasonable to assume that the average velocity remains essentially constant over the extent of all four quadrants, i.e., $Q_1-Q_4$, even though the direction and amount of dip may change from one quadrant to the next. If data quality is sufficiently poor, it may be necessary to place bounds on the amount of change which can be tolerated in the azimuth for each of the four quadrants. This constraint can then be imposed in the mathematical solution for the parameter estimates.

The following derivations are required for the quadrant analysis. In this solution, estimates of (L, m, c) are obtained for each quadrant, while the velocity estimate is required to be the same for each quadrant.

The equation for the travel time $T_{ij}$ from the source to the reflected horizon and back to the receiver is given below, where parameters $(L_1, L_2, L_3, L_4)$, $(m_1, m_2, m_3, m_4)$ and $(c_1, c_2, c_3, c_4)$ are respective direction cosines for each quadrant, and V is the average velocity to the reflecting horizon.

Thus, $$T_{ij} = (1/V)(S^2 + P^2 + 4UW^2) \qquad (10)$$

where $$S = \sum_{k=1}^{4} qk[x_j - x_i(1-2L_k^2) + 2L_k m_k y_i - 2L_k c_k]; \qquad (11)$$

$$W = \sum_{k=1}^{4} qk[1 - L_k^2 - m_k^2], \qquad (12)$$

$$U = \sum_{k=1}^{4} qk[c_k - L_k x_i - m_k y_i] \qquad (13)$$

and $$P = \sum_{k=1}^{4} qk[y_j - y_i(1-2m_k^2) + 2L_k m_k x_i - 2m_k c_k]. \qquad (14)$$

where $(X_i, Y_i)$ is the coordinate of the ith source, $(X_j, Y_j)$ is the coordinate of the jth receiver, and $qk$ is binary variable which assumes a value of 1 when the ith source and jth receiver measure a basement point that falls in the kth quadrant with zero registration for other quadrants.

The non-linear estimation process requires that partial derivatives of $T_{ix}$ and $T_{ij}$ with respect to each parameter be evaluated. The functional relationships for these partial derivatives are:

$$\partial T_{ij}/\partial V = (-1/V^2)(S^2 + P^2 + 4UW^2) \qquad (15)$$

$$\partial T_{ij}/\partial L = (1/V)(S^2 + P^2 + 4UW^2)^- [S(\partial S/\partial L) + P(\partial P/\partial L) + 2W^2(\partial U/\partial L) + 4UW(\partial W/\partial L)] \qquad (16)$$

with expression similar to Equation 16 for the then partial derivations with respect to m and c obtained by replacing L by the appropriate symbol. The values of S/L, S/m and S/c can then be easily derived from expressions (Equation 11), (Equation 12), (Equation 13), and (Equation 14).

Figure 3:
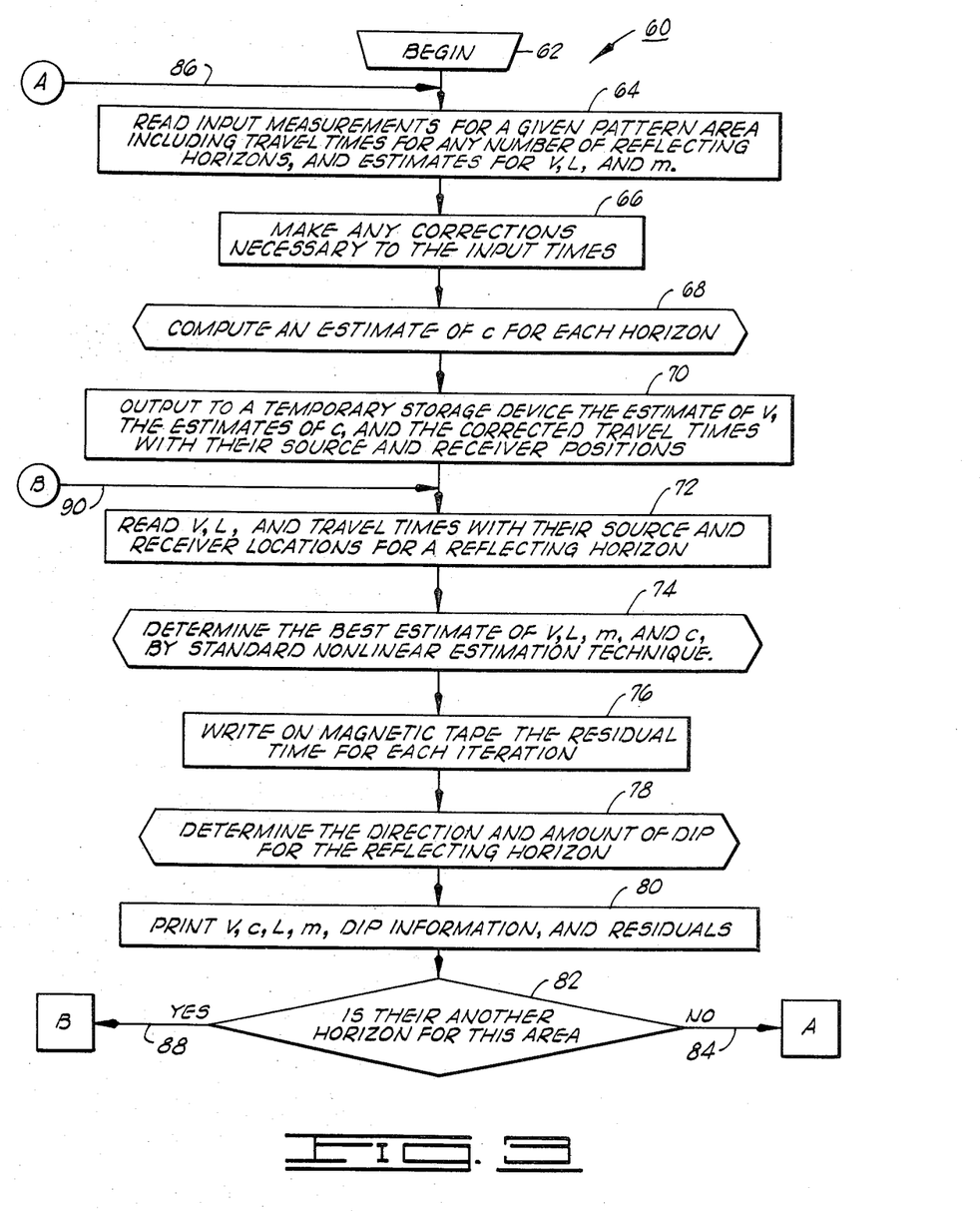
FIG. 3 is a flow diagram of the data processing program as utilized in the method of the present invention.

As previously stated, while some analog equipmentation may be utilized in systems carrying out the present invention, digital data processing provides the most accurate and facile way of determining the requisite strike, dip, velocity information for the derived event parameters. A flow diagram outlining the program which may be utilized for control of such digital data processing equipment is illustrated in FIG. 3. Thus, a program 60 begins at input stage 62 which functions with a processing stage 64 to read the input measurements for given local (or offset) quadrant pattern areas, which input measurements include travel times for any number of reflecting horizons, and estimates for the values of V, L and m. These values can be made available utilizing any of various well-known analog or analog/digital seismic signal processing equipment. Further, depending upon the phase of the method operation, the input measurements will be governed by the particular data pattern being processed, i.e. whether it is a local data information pattern or an offset data information pattern as derived between two separate SDV-modified cross patterns, as will be further described in greater detail.

Data flow proceeds from processing stage 64 for application to a processing stage 66 which functions to make corrections to input times. Processing stage 66 will make any corrections which may be necessary to the input travel times, i.e. source and receiver elevation corrections, re-insertion of ΔT elimination of time associated with a designated source or receiver position, etc.

The time corrected data from processing stage 66 is then applied to a pre-defined process stage 68 which serves to compute an initial estimate of c for each horizon or reflecting stratum being considered (data having been input). Thus, this amounts to computation of an estimate of perpendicular depth to the stratum for each horizon selected for investigation. The output from pre-defined process stage 68 is then applied to a processing state 70 which functions to select and store certain information relating to the processing. Processing stage 70 provides data output to temporary storage devices, which data represent an estimate of the velocity V and estimate of the perpendicular depth c as well as the corrected energy travel times and their related source and receiver positions. Output data from processing stage 70 proceeds through a processing stage 72 wherein data selection relative to a specific reflecting horizon is made. Stage 72 serves to read initial estimate values for the velocity V, VL value and the respective travel times with their source and receiver locations for a specific reflecting horizon.

Information flow from processing stage 72 then proceeds to a pre-defined process stage 74 wherein calculation is effected to determine the best estimate of V, L, m and c values, this stage carrying out the standard nonlinear estimate technique. The pre-defined processing stage 74 may utilize such as the Gauss-Newton iterations, and these techniques use the function of Equation 1 as well as the partial derivatives (Equations 6 through 9) of functions with respect to each of V, L, m and c for the respective data quadrant patterns within each quadrant of the local (or offset as the case may be) information data. An iterative solution must be utilized in order to obtain a least squares solution due to the fact that the parameters V, L, m, and c are nonlinearly related.

Output from pre-defined process stage 114 then proceeds to a processing stage 116 wherein the residual time data for each iteration is written on magnetic tape. That is, the difference between the input time and the time obtained by evaluating the function (Equation 1) for an iteration. The residual times for all source-receiver paths may be optionally saved. These times may be used subsequently to provide an estimate of weathering, or to test the assumption of a planar reflector. Output from processing stage 76 then proceeds to a pre-defined process stage 78 which effects determination of direction and amount of depth for the selected reflecting horizon or stratum. This stage utilizes final estimates of V, L, m and c to make such determinations, and this information is then output to stage 80 to provide an output record. The stage 80 provides printout of data for V, L, m and c and dip information, as well as for residual values. Output stage 80 is also processed through a decision stage 82 to ascertain as to the completion of the processing, as decision stage 82 tests to see whether or not there are additional horizons related to the selected area. If there exist no more horizons to be processed, a negative output via line 84 to the auxiliary operation stage A will serve to terminate the data processing function, as this information is recycled to input connector A and line 86 for signification to the input of processing stage 64. Alternatively, if another horizon of interest does exist for the area, affirmative control output via lead 88 to auxiliary operation stage B will provide indication via connector B and line 90 for restart of data processing at the processing stage 72. Thus, processing stage 72 will read next additional values of V, L, travel times, and receiver locations for the new data.

In addition to determination of the modified SDV data, i.e. reflection point data and strike, dip, velocity determinations relative to each data quadrant pattern 24, 26 and 32-42 (FIG. 1) of data quadrants 16, 18, 20 and 22, respectively, it is necessary to derive common depth point or CDP data for each of cross lines 12 and 14 for utilization in verification and/or correction of the modified SDV data. The CDP data can be derived by what is now conventional processing to derive the CDP data for selected horizons, the same horizons selected in the processing of FIG. 3, and all such CDP data is established with all possible redundancy to further enhance final determinations. Thus, referring to the flow diagram of FIG. 4, CDP input data is applied at a stage 92. CDP related input data will consist of source-receiver identification, cross line identification and travel time along with the particular horizon selection. Surface offset data for each CDP reflecting point is input at a stage 94.

Figure 4:
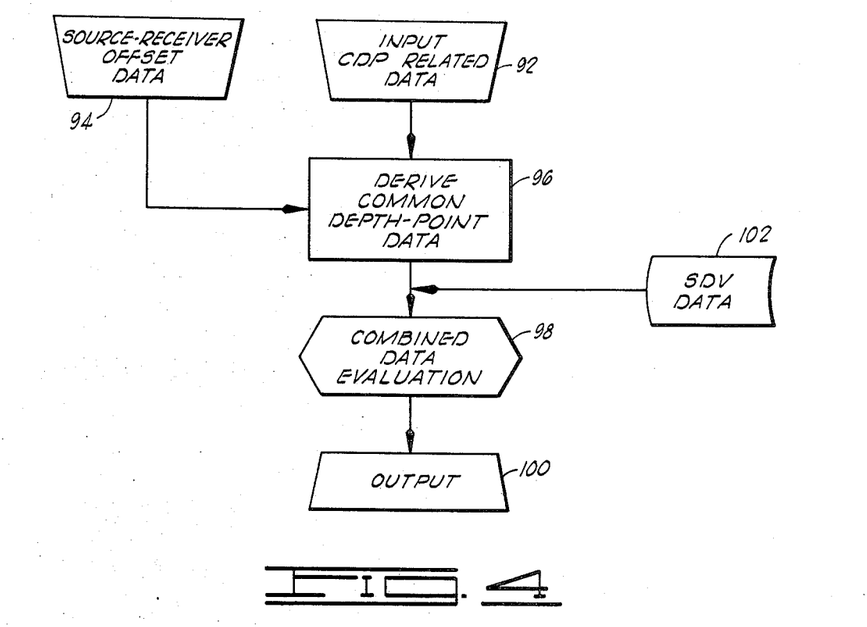
FIG. 4 is a flow diagram of data processing steps as utilized in derivation of final data output.

A processing stage 96 then derives precise energy travel time for each common depth point along each cross line of the source-receiver cross pattern. Redundant data may be reduced in any of several processing modes, e.g. mean-differential summation, a now well-known procedure.

On derivation of the continuous CDP data for each cross pattern, the CDP data is input to predetermined processing stage 98 along with the SDV data, previously derived in the manner illustration in FIG. 3, from appropriate storage 100. Process stage 98 conducts iterative analysis of SDV data from each data quadrant pattern in relation to the cross line derived CDP data to finally verify and/or correct the strike, dip and velocity data relative to the cross pattern. Thus, reflection point pattern data for the site of the particular source-receiver cross pattern is derived for output at stage 100 through any of various outputting devices, e.g. data printout, graphic output, computer mapping system, etc.

Figure 5:
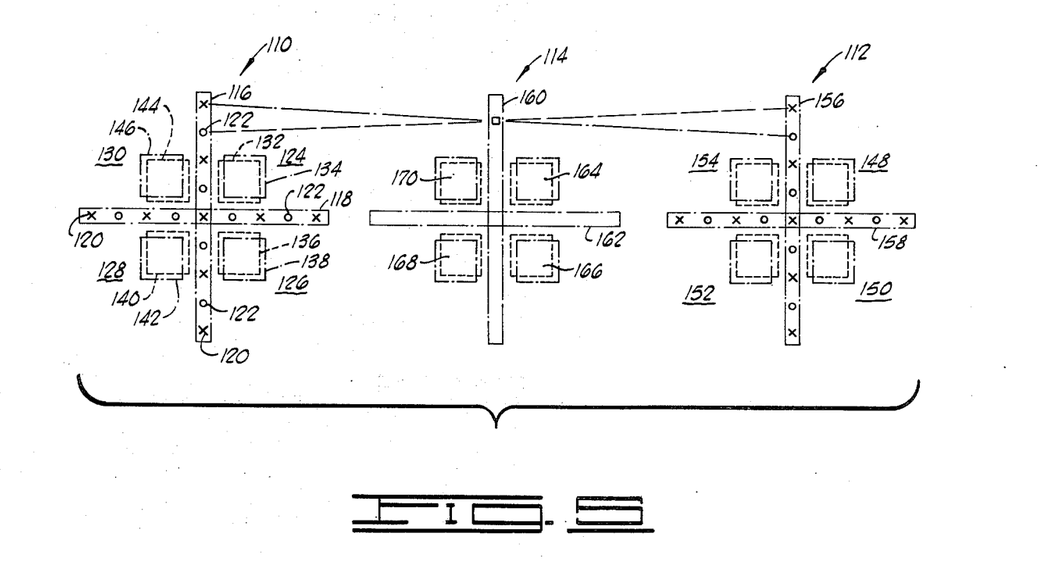
FIG. 5 is a generalized schematic indication illustrating the use of plural source-receiver cross patterns in relation to offset data patterns.

FIG. 5 illustrates a mode of usage wherein a series of SDV-modified cross patterns may be utilized in a field survey. Thus, data, both local and offset, may be derived for a series of diversely spaced SDV-modified cross patterns such that localized quadrantral data for strike, dip and velocity as well as localized CDP data may be derived for each cross pattern; and an interactive consideration as to energy traveling between the two spaced cross patterns may be processed to provide offset data for a location intermediate the cross patterns. Thus, considering the situation for two SDV-modified cross patterns 110 and 112, the interactive data compilations may be utilized to establish an offset cross pattern 114 at a distance essentially half way between cross patterns 110 and 112.

The SDV-modified cross pattern 110 may be located at a first earth surface location as a pattern of cross lines 116 and 118 each consisting of alternating sources 120 and receivers 122. By regulating data as discussed with respect to FIG. 1, specific reflection point data patterns may be set up in quadrants 124, 126, 128 and 130. Thus, the data quadrant patterns 132/134, and 136/138 and 140/142 and, finally, 144/146 are set up in the respective quadrants 124–130. In addition, common depth point information may be derived for each of cross lines 116 and 118 in the manner afore described. Final data compilation for SDV-modified cross pattern 110 then consists of determination of unified data within each cross pattern quadrant as further validated by comparison with the CDP data derived from cross lines 116 and 118.

In like manner, SDV data can be compiled for each of quadrants 148, 150, 152 and 154, as delineated by surface arrayed source-receiver cross lines 156 and 158. A similar processing operation will then allow establishment of strike, dip and velocity data for reflection point patterns in each of quadrants 148–154 with further validation through iterative comparison with common depth point data derived from source-receiver cross lines 156 and 158.

In addition to the localized data as compiled for each of the SDV-modified cross patterns 110 and 112 there arises an additional grouping of data for an offset reflection point cross pattern 114 as it may be envisioned at the selected substrata or selected horizon of examination. Thus, energy generated at sources along cross line 116 can be received by receivers along cross line 156 to establish a series of reflection points from the common depth point along offset cross line 160. Energy emanating from sources along cross line 118 may be received by receivers along cross line 158 of cross pattern 112 to establish common depth point reflection point data pertaining to sub-stratum or offset cross line 162.

The offset cross pattern 114 can be established not only for the common depth point data but also for quadrature arrayed reflection points as indicated by the quadrant data pattern 164, 166, 168 and 170. Depending upon the length of cross lines and the number of source-receivers therealong, very complete and accurate offset reflection point patterns can be detected for the offset quadrant data patterns 164–170. These patterns too are susceptible of validation through comparison with the respective CDP data as derived for cross lines 160 and 162, as well as with iterative data processing relative to any of the localized data groupings, i.e. either CDP or quadrature SDV data.

It is contemplated that extensive data over a line of surface extending many miles can be established through usage of a relatively few spaced cross pattern source-receiver arrays, output data from which is processed relative to meaningful offset data intermediate the successive cross pattern locations. While the illustrations depict the operation of the method with relatively few sources and receivers in a cross line, it should be understood that a great many more than shown would normally be included in a cross line. That is, for example, a cross line could cover upwards of 2 to 3 miles while including a very large number of alternating sources and receivers or groupings thereof. While it is important that cross lines of a single cross pattern be essentially the same as to length, number of transducers and transducer spacing, it is not entirely controlling since data processing input can allow for certain discontinuities or irregularities in source-receiver spacing. This factor becomes very important when a survey line extends over rough terrain or lake country which interferes with the normal or desirable source-receiver spacing within cross pattern lines.

The foregoing discloses a method for determining meaningful data relative to selected horizons or substrata of interest. Usage of the method of the invention enables compilation of maximum data while requiring minimal repetition and movement of sources and receivers utilized in the survey. The method is particularly advantageous in notably poor record areas since it also makes available stacked CDP trace data, the quality of which is usually significally better than data compiled for SDV traces in such types of terrain. Thus, the related CDP information provides usable information at sites where the interpretation of the SDV trace data may be questionable. Further, use of the sounding modification method serves to extend the maximum range of offsets to a figure about 1.4 times greater than that which is possible with the usual types of SDV cross pattern survey layouts. Such additional range is not only desirable from the standpoint of savings in time and crew expense, but also as an aid in data determination since it becomes easier to identify multiple reflections and other forms of interference.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A method of geophysical seismic surveying to define sub-surface lithological structure at a given location of earth surface, comprising the steps of:

placing on said location a first line of seismic energy transducers consisting of both energy sources and receivers in spaced disposition;

placing on said location a second line of seismic energy transducers consisting of both energy sources and receivers in spaced disposition, said second line being located essentially perpendicular and bisecting said first line to define four quadrants therebeneath;

energizing all seismic energy sources to receive reflected energy from a selected sub-stratum at all receivers from each seismic energy source; and processing separately said received energy from the sub-stratum beneath each quadrant to determine strike, dip, velocity data for each.

2. A method of geophysical prospecting as set forth in claim 1 which is further characterized to include the step of:

processing separately said received energy from all sources in the same line as the receivers to derive two crossed lines of common depth point data relative to said selected sub-stratum.

3. A method of geophysical prospecting as set forth in claim 2 which is further characterized to include the step of:

further processing said strike, dip, velocity data derived for each quadrant in relation to the derived crossed line common depth point data to further validate the localized data for said selected sub-stratum of said location.

4. A method of geophysical prospecting as set forth in claim 1 which is further characterized to include the steps of:

placing at a second location, spaced from said first location, third and fourth lines of transducers at bisecting, perpendicular disposition, said third and fourth lines of transducers consisting of both seismic sources and receivers, and said third and fourth lines defining four quadrants therebeneath;

successively energizing all seismic energy sources at said second location to receive seismic energy from said selected sub-stratum; and processing separately said received energy from the sub-stratum beneath each quadrant of said second location to determine strike, dip, velocity data for each.

5. A method of geophysical prospecting as set forth in claim 4 which is further characterized to include the step of:

further processing said strike, dip, velocity data derived for each quadrant of said second location in relation to said strike, dip, velocity data derived for each quadrant of said second location to derive compound strike, dip, velocity data related to said selected sub-stratum from said first location to said second location.

6. A method of geophysical prospecting as set forth in claim 4 which is further characterized to include the steps of:

processing separately said received energy from all sources in the same line as the receivers of said third and fourth lines at said second location to derive two crossed lines of common depth point data relative to said selected sub-stratum.

7. A method of geophysical prospecting as set forth in claim 6 which is further characterized to include the step of:

further processing said strike, dip, velocity data derived for each quadrant of said second location in relation to the corresponding second location common depth point data to further validate the localized data for the selected sub-stratum at said second location.

8. A method of geophysical prospecting as set forth in claim 7 which is further characterized to include the step of:

compounding strike, dip, velocity data derived for each of said first and second location underlying quadrants and said first and second location common depth point data to derive strike, dip, velocity data relating to said sub-stratum extending from said first location to said second location.

9. A method of geophysical prospecting as set forth in claim 6 which is further characterized to include the step of:

further processing separately said received energy from selected sources at said first location as received by selected receivers at said second location to derive offset strike, dip, velocity data for the selected sub-stratum at a location intermediate said first and second locations.

10. A method of geophysical prospecting as set forth in claim 9 which is further characterized to include the step of:

deriving offset common depth point data along a sub-stratum line intermediate said first and second locations from reflected energy emanating from a selected line of sources at said first location and received by a selected line of receivers at said second location, and augmenting said offset strike, dip, velocity data in accordance therewith.

11. A method for deriving seismic energy data for selected substrata underlying an earth location, comprising:

positioning a first line of alternating seismic energy sources and receivers on said earth location;

positioning a second line of alternating seismic energy sources and receivers on said earth location bisecting and generally perpendicular to said first line;

successively energizing all sources of each line and receiving reflected seismic energy from sources of one line at all receivers of the other line;

successively energizing all sources of each line and receiving reflected seismic energy from sources of one line at all receivers of the same line; and recording reflected seismic energy indications from successive energizing of all sources as quadrantal related reflection data from a selected sub-stratum and common depth point related reflection data for said substratum.

12. A method as set forth in claim 11 which is further characterized to include steps of:

positioning third and fourth lines of alternating seismic energy sources and receivers arrayed in bisecting, generally perpendicular disposition at a second, spaced earth location;

successively energizing all sources of each of said third and fourth lines and receiving reflected seismic energy from said selected substratum at, respectively, receivers of other lines and receivers of same lines; and recording reflected seismic energy indications from successive energizations of all sources of said third and fourth lines as quadrantal related reflection data and common depth point related reflected data for said substratum at said spaced earth location.

13. A method as set forth in claim 12 which is characterized to include further steps of:
recording offset quadrantal reflected seismic energy indications for said substratum which emanate from sources of said first and second lines to those receivers of said third and fourth lines which are aligned generally perpendicular to said direction of the spaced location from said first earth location; and
recording offset quadrantal reflected seismic energy indications for said substratum which emanate from sources of said third and fourth lines to those receivers of said first and second lines which are aligned generally perpendicular to said direction of said first earth location from said spaced earth location.

14. A method as set forth in claim 12 which is characterized to include further steps of:
recording offset common depth point seismic energy indications from energy emanating from linearly arrayed sources at both earth locations to the alternate receivers of the same respective linear arrays in order to establish common depth point data for said substratum intermediate said first and spaced earth locations.

15. A method as set forth in claim 13 which is characterized to include further steps of:
recording offset common depth point seismic energy indications from energy emanating from linearly arrayed sources at both earth locations to the alternate receivers of the same respective linear arrays in order to establish common depth point data for said substratum intermediate said first and spaced earth locations.

16. In a method for processing seismic energy data for selected substrata of an earth location where said data is acquired by cross-pattern energization of plural seismic energy sources in predetermined order, and wherein said cross-pattern consists of a first row of alternating seismic energy sources and receivers and a second row of alternating sources and receivers intersecting and generally perpendicular relative to said first row, and wherein selective energization of seismic energy sources establishes patterns for both quadrantal data for a selected substrata and common depth point data for a selected substrata, the method of processing received seismic energy data utilizing automatic data processing equipment which comprises the steps of:
assembling seismic energy data for a selected substratum as received by plural seismic energy receivers in each line which seismic energy emanates from seismic energy sources in the other line of the cross-pattern thereby to define a quadrature array of energy reflection point groups at said substratum;
assembling seismic energy data for a selected substratum as received by plural seismic energy receivers of each line which seismic energy emanates from plural seismic energy sources of the same line of the cross-pattern, thereby to define common depth point energy reflection point groups at said substratum; and
evaluating the relative strike and dip parameter variations between each quadrature arrayed group of energy reflection points at said substratum in relation to said common depth point groups to provide an indication of the attitude trend of the selected substratum relative to said earth location.

17. The method as set forth in claim 16 which includes the further steps of:
assembling seismic energy data derived from a second cross-pattern energization for said selected substratum underlying said earth location at a spaced distance from the first earth location thereby to define second quadrature arrayed energy reflection point groups and second common depth point energy reflection point groups; and
evaluating relative strike and dip parameter variations for all quadrature arrayed reflection point groups and common depth point reflection point groups thereby to compile an attitude trend indication for the selected substratum underlying the first earth location and extending to said spaced earth location.

18. The method as set forth in claim 17 which includes the further step of:
selectively processing received seismic energy from the first cross-pattern at said second cross-pattern and received seismic energy from the second cross-pattern at said first cross-pattern to establish data indicative of a quadrature array of reflection point groups from said selected substratum underlying said earth location intermediate said cross-patterns.

19. A method as set forth in claim 16 which further comprises the step of:
processing said plural groups of quadrature arrayed reflection point data and common depth point reflection point data to determine strike, dip and velocity of incident seismic energy, and providing a trend display of said data over the inclusive earth location.

20. A method as set forth in claim 19 which comprises the further steps of:
deriving quadrature arrayed reflection point data and common depth point reflection point data for each of plural cross-patterns periodically disposed along a line of survey; and
deriving quadrature arrayed reflection point data and common depth point reflection point data for each position intermediate each successive pair of cross-patterns along said line of survey.

* * * * *